United States Patent
Eki

(10) Patent No.: US 11,350,046 B2
(45) Date of Patent: May 31, 2022

(54) SOLID-STATE IMAGING DEVICE AND ELECTRONIC DEVICE

(71) Applicant: SONY SEMICONDUCTOR SOLUTIONS CORPORATION, Kanagawa (JP)

(72) Inventor: Ryoji Eki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/250,438

(22) PCT Filed: Jul. 31, 2019

(86) PCT No.: PCT/JP2019/030092
§ 371 (c)(1),
(2) Date: Jan. 21, 2021

(87) PCT Pub. No.: WO2020/027229
PCT Pub. Date: Feb. 6, 2020

(65) Prior Publication Data
US 2021/0289151 A1    Sep. 16, 2021

(30) Foreign Application Priority Data
Jul. 31, 2018 (JP) .............................. JP2018-144172
Jul. 31, 2019 (JP) .............................. JP2019-140824

(51) Int. Cl.
H04N 5/347     (2011.01)
H04N 5/232     (2006.01)
(Continued)

(52) U.S. Cl.
CPC ......... H04N 5/347 (2013.01); H04N 5/23218 (2018.08); H04N 5/3415 (2013.01); H04N 5/351 (2013.01)

(58) Field of Classification Search
CPC ...... H04N 5/347; H04N 5/351; H04N 5/3415; H04N 5/23218
See application file for complete search history.

(56) References Cited

U.S. PATENT DOCUMENTS

2010/0231738 A1*  9/2010  Border ............... H04N 5/2353
                                                348/222.1
2016/0373645 A1* 12/2016  Lin ...................... G06F 3/013
(Continued)

FOREIGN PATENT DOCUMENTS

CN    109691079 A     4/2019
JP    2013-236659 A  11/2013
(Continued)

OTHER PUBLICATIONS

International Search Report and Written Opinion of PCT Application No. PCT/JP2019/030092, dated Oct. 8, 2019, 12 pages of ISRWO.

Primary Examiner — Ahmed A Berhan
(74) Attorney, Agent, or Firm — Chip Law Group

(57) ABSTRACT

A solid-state imaging device including an imager that acquires image data, a processing unit that performs a process based on a neural network calculation model for data based on the image data acquired from the imager, and a control unit that switches between a first process mode of performing a first process at a first frame rate and, based on a result of the first process, a second process mode of performing a second process at a second frame rate.

11 Claims, 11 Drawing Sheets

(51) Int. Cl.
  *H04N 5/341* (2011.01)
  *H04N 5/351* (2011.01)

(56) References Cited

U.S. PATENT DOCUMENTS

2017/0063351 A1  3/2017  Kurokawa
2019/0204448 A1  7/2019  Eki

FOREIGN PATENT DOCUMENTS

| JP | 2017-054502 A | 3/2017 |
| KR | 10-2019-0051968 A | 5/2019 |
| WO | 2017/037568 A1 | 3/2017 |
| WO | 2018/051809 A1 | 3/2018 |

* cited by examiner

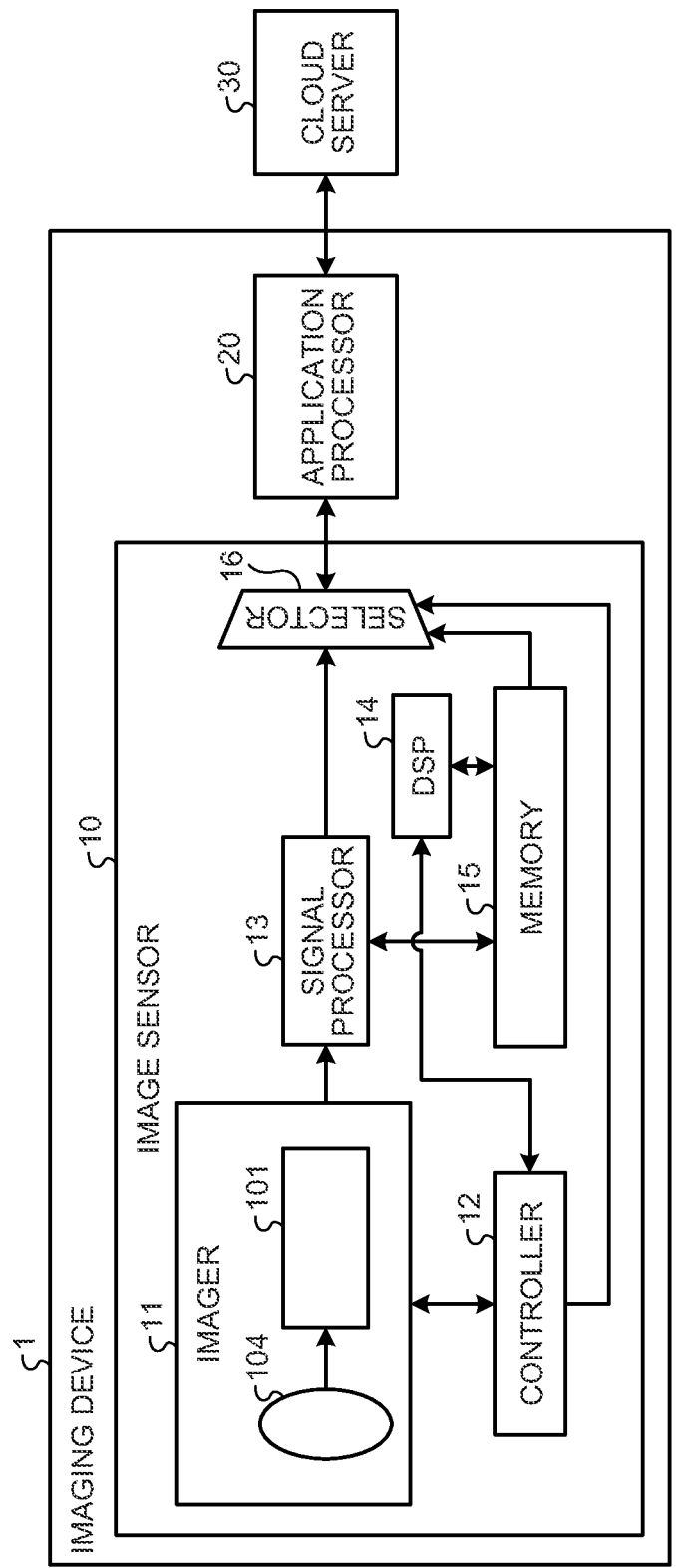

SOLID-STATE IMAGING DEVICE AND ELECTRONIC DEVICE

CROSS REFERENCE TO RELATED APPLICATIONS

This application is a U.S. National Phase of International Patent Application No. PCT/JP2019/030092 filed on Jul. 31, 2019, which claims priority benefit of Japanese Patent Application No. JP 2018-144172 filed in the Japan Patent Office on Jul. 31, 2018 and Japanese Patent Application No. JP 2019-140824 filed in the Japan Patent Office on Jul. 31, 2019. Each of the above-referenced applications is hereby incorporated herein by reference in its entirety.

FIELD

The present disclosure relates to a solid-state imaging device and an electronic device. Specifically, the present disclosure relates to dynamic control of frame rate.

BACKGROUND

A device such as a digital camera is equipped with an image sensor having a complementary metal oxide semiconductor (CMOS) and a digital signal processor (DSP). In the image sensor, the captured image is supplied to the DSP and undergoes a variety of processing in the DSP to be output to an external device such as an application processor.

CITATION LIST

Patent Literature

Patent Literature 1: WO2018/051809

SUMMARY

Technical Problem

Unfortunately, in the conventional technique above, typically, simple image processing such as noise removal is performed in the DSP in the image sensor, and complicated processing such as facial recognition using image data is performed in the application processor. Since designing the DSP appropriate for an application and installing an application for each process impose a heavy burden on developers and users, it has been desired that more complicated processing is performed in the chip of the image sensor.

The present disclosure then proposes a solid-state imaging device and an electronic device capable of performing more complicated processing in the chip of the image sensor.

Solution to Problem

To solve the above-described problem, a solid-state imaging device according to one aspect of the present disclosure includes an imager configured to acquire image data, a processing unit configured to perform a process based on a neural network calculation model for data based on the image data acquired from the imager, and a control unit configured to switch between a first process mode of performing a first process at a first frame rate and, based on a result of the first process, a second process mode of performing a second process at a second frame rate.

Moreover, according to the present disclosure, a solid-state imaging device includes a DSP to run a DNN (Deep Neural Network) in a chip, changes the frame rate dynamically depending on whether the DSP process is performed by DSP, and implements execution of a complicated process in the chip.

Advantageous Effects of Invention

According to the present disclosure, more complicated processing can be performed in the chip of the image sensor. The effect described here is not always limitative, and any other effects described in the present disclosure may be achieved.

BRIEF DESCRIPTION OF DRAWINGS

FIG. 1 is a block diagram illustrating an overall configuration example of an imaging device as an electronic device according to a first embodiment.

DESCRIPTION OF EMBODIMENTS

Figure 2A:
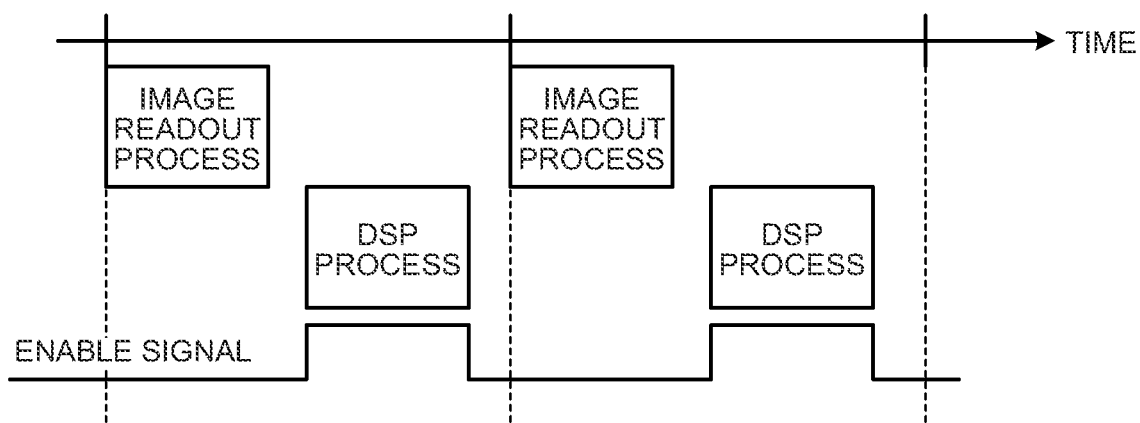
FIG. 2A is a diagram illustrating a first process mode according to the first embodiment.

Embodiments of the present disclosure will be described in detail below with reference to the drawings. In the following embodiments, the same parts are denoted by the same reference signs and an overlapping description will be omitted.

The present disclosure will be described in the order of items below.

1. First Embodiment
2. Modification (1) to First Embodiment
3. Modification (2) to First Embodiment
4. Chip Configuration of Image Sensor
5. Layout Example
6. Other Embodiments
7. Application to Movable Body
8. Application to Endoscopic Surgery System

1. First Embodiment

[1-1. Configuration of Image Processing System According to First Embodiment]

FIG. 1 is a block diagram illustrating an overall configuration example of an imaging device as an electronic device according to a first embodiment. As illustrated in FIG. 1, an imaging device 1 is connected to communicate with a cloud server 30. The imaging device 1 and the cloud server 30 are connected either wired or wirelessly to communicate through a variety of networks and universal serial bus (USB) cables.

The cloud server 30 is an example of a server device that stores image data such as still images and moving images transmitted from the imaging device 1. For example, the cloud server 30 can store image data in any units, such as by users, by days, or by image capturing locations, and provide a variety of services such as creating a photobook using image data.

The imaging device 1 is an example of an electronic device having an image sensor 10 and an application processor 20. Examples include digital cameras, digital camcorders, tablet terminals, and smartphones. Although the following embodiments are described with an example of capturing an image, the present invention is not limited thereto and, for example, a moving image can also be processed similarly.

The image sensor 10 is, for example, a complementary metal oxide semiconductor (CMOS) image sensor configured in one chip, receives incident light, performs photoelectric conversion, and outputs image data corresponding to the quantity of received incident light to the application processor 20.

The application processor 20 is an example of a processor such as a central processing unit (CPU) that executes a variety of applications. The application processor 20 performs a variety of processes corresponding to applications, such as a display process of displaying image data input from the image sensor 10 on a display, a biometric authentication process using image data, and a transmission process of transmitting image data to the cloud server 30.

Such an image sensor 10 of the imaging device 1 has a DSP in a chip to run a DNN, thereby implementing execution of a complicated process in the chip. However, when a DNN is installed in the image sensor 10, a readout process of a captured image and a DSP process of performing a complicated process are sometimes performed concurrently. If a DSP process is performed concurrently with an image readout process, noise resulting from the DSP process may intrude into the read image data to deteriorate the quality of the image. Then, in the image sensor 10 according to the first embodiment, quality deterioration of an image is suppressed by controlling the execution period of the DSP process relative to the execution period of the image readout process.

[1.2 Configuration of Imaging Device According to First Embodiment]

As illustrated in FIG. 1, the imaging device 1 includes the image sensor 10 that is a solid-state imaging device and the application processor 20. The image sensor 10 includes an imager 11, a controller (also referred to as control unit) 12, a signal processor 13, a DSP (also referred to as processing unit) 14, a memory 15, and a selector 16.

The imager 11 includes, for example, an optical system 104 including a zoom lens, a focus lens, and an aperture, and a pixel array 101 having a configuration in which unit pixels including light-receiving elements such as photodiodes are arranged in a two-dimensional matrix. External incident light passes through the optical system 104 to form an image on a light-receiving surface that is an array of light-receiving elements in the pixel array 101. Each unit pixel in the pixel array 101 converts light incident on its light-receiving element into electricity to accumulate charge in accordance with the quantity of incident light so that the charge can be read out.

The imager 11 includes a converter (analog-to-digital converter, hereinafter referred to as ADC) 17 (for example, see FIGS. 2A and 2B). The ADC 17 converts an analog pixel signal for each unit pixel read from the imager 11 to a digital value to generate digital image data and outputs the generated image data to the signal processor 13. The ADC 17 may include a voltage generating circuit that generates a drive voltage for driving the imager 11 from power supply voltage and the like.

The size of image data output by the imager 11 can be selected from a plurality of sizes, for example, 12M (3968× 2976) pixels and a video graphics array (VGA) size (640× 480 pixels Z). The image data output by the imager 11 can be selected from, for example, RGB (red, green, blue) color image or white and black image only having brightness. These selections can be made as a kind of shooting mode settings.

The controller 12 controls each part in the image sensor 10, for example, in accordance with user's operation or an operation mode being set.

For example, the controller 12 monitors the image readout process of reading out an image signal from the imager 11 described later, and upon completion of the image readout process, notifies the DSP 14 to start the DSP process. Specifically, the controller 12 counts the internal clock and switches an enable signal to control whether to overlap the DSP process with the readout process of image data from the imager (hereinafter simply referred to as image readout process).

For example, the controller 12 outputs a LOW enable signal (that is, OFF signal) to the DSP 14 while the image readout process from the imager 11 is being performed. Upon completion of the image readout process from the imager 11, the controller 12 outputs a HIGH enable signal (that is, ON signal) to the DSP 14. Subsequently, upon completion of the DSP process by the DSP 14, the controller 12 outputs a LOW enable signal (that is, OFF signal) to the DSP 14.

The signal processor 13 performs a variety of signal processing for digital image data read from the imager 11 or digital image data read from the memory 15 (hereinafter referred to as process target image data). For example, when the process target image data is a color image, the signal processor 13 converts the format of this image data to YUV image data, RGB image data, or the like. The signal processor 13 performs, for example, processing such as noise removal and white balance adjustment for the process target image data, if necessary. In addition, the signal processor 13 performs a variety of signal processing (also referred to as pre-processing) for the process target image data in order for the DSP 14 to process the image data.

The DSP 14 executes, for example, a computer program stored in the memory 15 to function as a processing unit that performs a variety of processing using a pre-trained model created by machine learning using a deep neural network (DNN). For example, the DSP 14 performs a computation process based on the pre-trained model stored in the memory 15 to perform a process of combining image data with a dictionary coefficient stored in the memory 15. The result obtained through such a computation process (computation result) is output to the memory 15 and/or the selector 16. The computation result may include image data obtained by performing a computation process using the pre-trained model and a variety of information (metadata) obtained from the image data. A memory controller for controlling access to the memory 15 may be embedded in the DSP 14.

More specifically, when the enable signal output from the controller 12 changes from LOW (OFF) to HIGH (ON), the DSP 14 reads out image data from the memory 15 and performs the DSP process. That is, the DSP 14 performs the DSP process in a period of time in which the enable signal is ON.

The image data to be processed by the DSP 14 may be image data normally read out from the pixel array 101 or may be image data having a data size reduced by decimating pixels of the image data normally read out. Alternatively, the image data to be processed may be image data read out in a data size smaller than normal obtained by performing readout from the pixel array 101 with pixels decimated. As used herein "normal readout" may be readout without decimating pixels.

Some computation processes use, for example, a pre-trained learning model that is an example of a neural network calculation model. Examples of the pre-trained learning model include DNNs and support vector machines that have learned identification of persons and animals, brightness correction, face extraction, and image correction using training data. The DSP process uses, for example, the pre-trained learning model to specify a person from a captured image, corrects brightness or noise of a captured image, or extract a face from a captured image. The DSP 14 can perform the computation process described above by training a learning model by changing the weights of a variety of parameters in the learning model using training data, preparing a plurality of learning models and changing a learning model to be used in accordance with a computation process, or acquiring a pre-trained learning model from an external device.

The memory 15 stores image data output from the imager 11, image data subjected to signal processing by the signal processor 13, a computation result obtained from the DSP 14, and the like, if necessary. The memory 15 also stores an algorithm of the pre-trained learning model to be executed by the DSP 14 in the form of a computer program and a dictionary coefficient.

The memory 15 may store the International Organization for Standardization (ISO) sensitivity, exposure time, frame rate, focus, shooting mode, cutout range, and the like, in addition to image data output from the signal processor 13 and image data subjected to a computation process output from the DSP 14 (hereinafter referred to as processed image data). That is, the memory 15 may store a variety of imaging information set by the user.

The selector 16, for example, selectively outputs image data output from the signal processor 13 or image data or a computation result stored in the memory 15, in accordance with a select control signal from the controller 12. One of the processed image data and the computation result such as metadata stored in the memory 15 is selected by the user's setting, for example, and output to the application processor 20.

More specifically, when a first process mode is selected, the selector 16 reads the computation result generated by the DSP 14 from the memory 15 and outputs the read computation result to the application processor 20. On the other hand, when a second process mode is selected, the selector 16 outputs image data input from the signal processor 13 to the application processor 20. When the first process mode is selected, the selector 16 may output the computation result output from the DSP 14 directly to the application processor 20.

As described above, the image data or the computation result output from the selector 16 is input to the application processor 20 that processes display and user interface. The application processor 20 is configured, for example, with a central processing unit (CPU) and executes an operating system and a variety of application software. This application processor 20 may be equipped with functions such as a graphics processing unit (GPU) and a baseband processor. The application processor 20 performs a variety of processes for the input image data or the computation result as necessary, or performs display to users, or transmits the input image data or the computation result to an external cloud server 30 through a predetermined network 40.

For example, a variety of networks such as the Internet, a wired local area network (LAN) or a wireless LAN, a mobile communication network, or Bluetooth (registered trademark) can be applied to the predetermined network 40. The image data or the computation result may be transmitted not only to the cloud server 30 but also to a variety of information processing devices (systems) having a communication function, such as a server operating on its own, a file server storing a variety of data, and a communication terminal such as a mobile phone.

[1.3 Description of Process Modes According to First Embodiment]

The process modes according to the first embodiment will now be described. FIG. 2A is a diagram illustrating the first process mode according to the first embodiment, and FIG. 2B is a diagram illustrating the second process mode according to the first embodiment. FIG. 2A illustrates the first process mode processed at a first frame rate, and FIG. 2B illustrates the second process mode processed at a second frame rate that is higher than the first frame rate. For example, the first process mode in FIG. 2A is processed at 1 frame rate (fps), and the second process mode in FIG. 2B is processed at 30 frame rate.

As illustrated in FIG. 2A, when the first process mode is selected, the controller 12 keeps the enable signal LOW while the image readout process from the imager 11 is being performed and, upon completion of the image readout process, changes the enable signal to HIGH. When detecting that the enable signal is changed to HIGH, the DSP 14 starts the DSP process. Subsequently, upon completion of the DSP process, the controller 12 changes the enable signal to LOW. As a result, the next image readout process is performed in the imager 11.

Figure 2B:
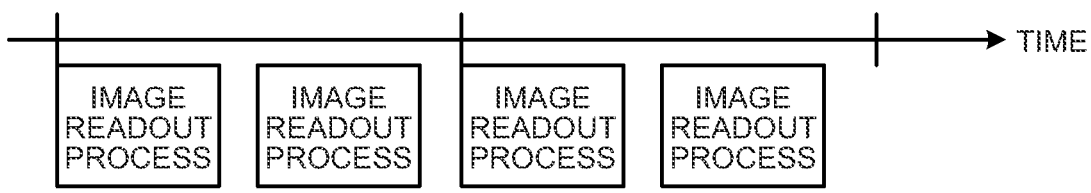
FIG. 2B is a diagram illustrating a second process mode according to the first embodiment.

As illustrated in FIG. 2B, since the enable signal is always kept LOW while the second process mode is selected, the image readout process from the imager 11 is successively performed in accordance with the frame rate.

For example, the switching of the process modes illustrated in FIG. 2A and FIG. 2B can be applied to a security camera. Specifically, while the enable signal is set to HIGH and the first process mode illustrated in FIG. 2A is selected, the controller 12 reads out an image from the imager 11, and the DSP 14 performs human presence detection from the read image. When the DSP 14 detects a person, the controller 12 sets the enable signal to LOW and performs only the process of reading out and outputting an image from the imager 11. In this way, the image readout process and the human presence detection by the DSP 14 are performed until a suspicious person or the like is detected, and upon detection of a suspicious person, the computation process based on a neural network calculation model is eliminated, and the image readout process alone is prioritized. The application processor 20 therefore can implement early detection of a suspicious person, can grasp the motion of the detected suspicious person, and can monitor the suspicious person. When a person is no longer detected, the first process mode returns.

The switching of the process modes illustrated in FIG. 2A and FIG. 2B can be applied to a camera that shoots athletes of a variety of sports. Specifically, while the enable signal is set to HIGH and the first process mode illustrated in FIG. 2A is selected, the controller 12 reads out an image of a tennis player from the imager 11, and the DSP 14 detects a state of the tennis player holding a racket from the read image. When the DSP 14 detects this state, the controller 12 sets the enable signal to LOW and performs only the process of reading out and outputting an image from the imager 11. In this way, the image readout process and the human presence detection by the DSP 14 are performed until the tennis player hits a ball with the racket, and upon detection of the timing when a ball is hit, the image readout process alone is prioritized. The application processor 20 therefore can specify the motion of hitting a ball from the start to the end at an earlier stage and can provide output to users. When a state of finishing swinging the racket ends, the first process mode returns.

As described above, in the second process mode, when a certain detection target such as a person is detected by the DSP process of the DSP 14 in the first process mode, the DSP process by the DSP 14 is not performed but the image data readout process by the controller 12 is performed at the second frame rate that is higher than the first frame rate in the first process mode. This eliminates the need for wait time in which the completion of the DSP process is waited in the first process mode. In the second process mode, therefore, the image readout process can be performed at the second frame rate that is a frame rate that is higher (for example, twice) than the first frame rate in the first process mode.

[1.4 Flow of Process According to First Embodiment]

Figure 3:
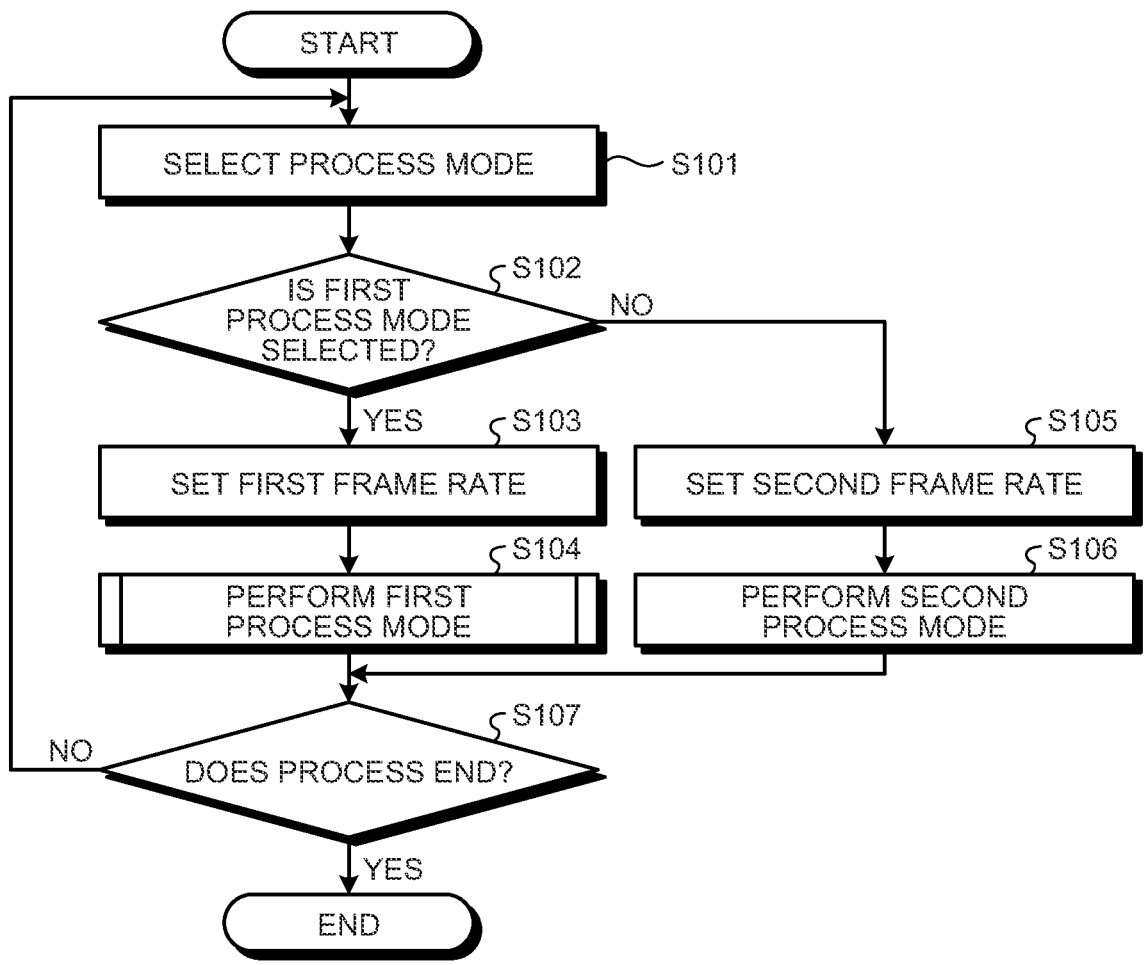
FIG. 3 is a flowchart illustrating a process mode selecting process according to the first embodiment.

FIG. 3 is a flowchart illustrating a process mode selecting process according to the first embodiment. As illustrated in FIG. 3, the controller 12 displays a process mode select screen on a display or the like and accepts selection of a process mode (S101).

If the first process mode is selected (Yes at S102), the controller 12 sets the frame rate to the first frame rate (S103). Subsequently, the image readout process in the first process mode is performed (S104).

On the other hand, if the second process mode is selected (No at S102), the controller 12 sets the frame rate to the second frame rate that is higher than the first frame rate (S105). Subsequently, the image readout process in the second process mode is performed (S106).

When the process is terminated, for example, by the operation of terminating the image capturing process or by power-off (Yes at S107), resetting of the settings is performed. On the other hand, if the process continues (No at S107), the process subsequent to S101 is repeated. That is, the previous process mode is kept until the user changes the process mode, and when the process mode is changed, the frame rate is changed in accordance with FIG. 3.

Figure 4:
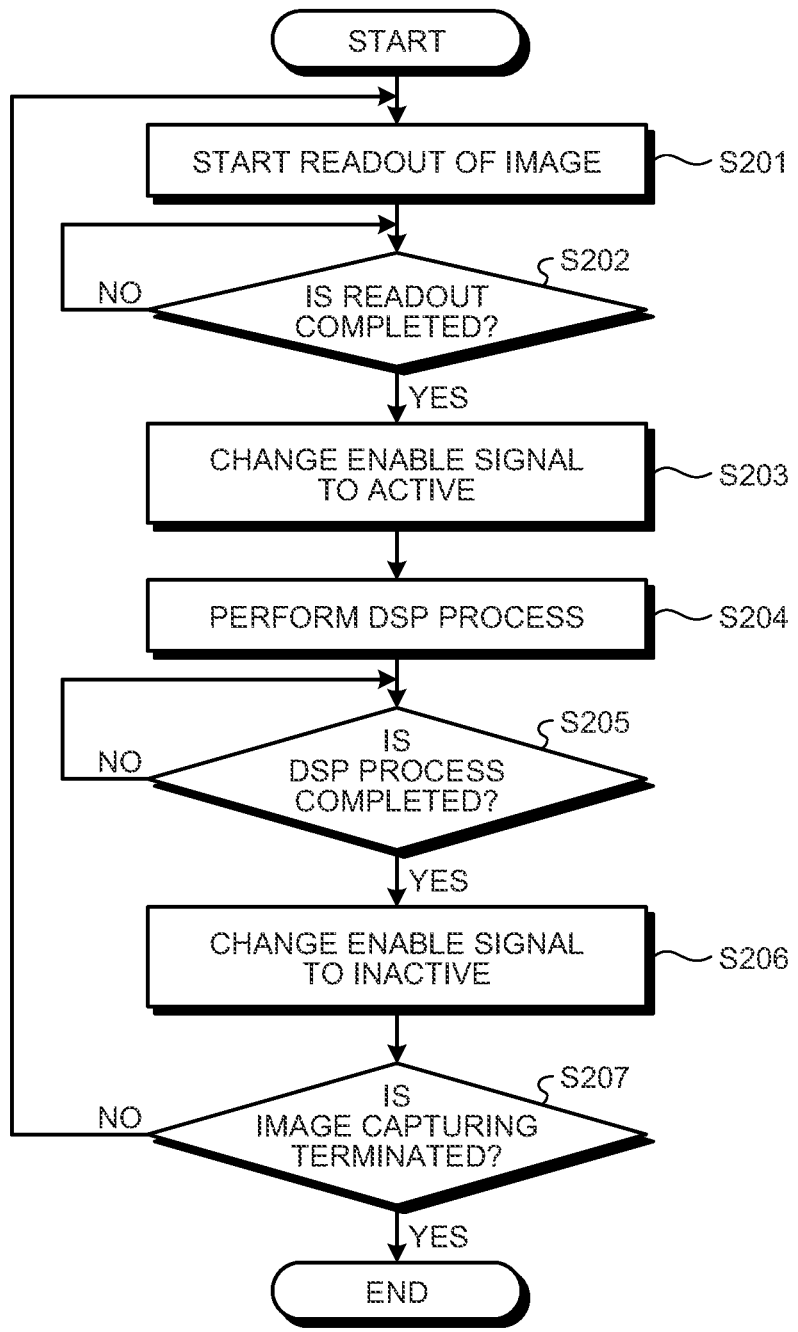
FIG. 4 is a flowchart illustrating the first process mode according to the first embodiment.

FIG. 4 is a flowchart illustrating the first process mode according to the first embodiment. The process in FIG. 4 is performed at S104 in FIGS. 2A and 2B.

As illustrated in FIG. 4, upon start of image capturing in the first process mode, the controller 12 starts the image readout process of reading out image data from the imager 11 (S201). Upon completion of the image readout process from the imager 11 (Yes at S202), the controller 12 changes the enable signal to ACTIVE (ON) (S203).

Subsequently, the DSP 14 performs the DSP process (S204). Upon completion of the DSP process (Yes at S205), the controller 12 changes the enable signal to INACTIVE (OFF) (S206). Subsequently, if image capturing continues (No at S207), the process returns to S201. On the other hand, if, for example, the operation to terminate image capturing is accepted (Yes at S207), the process ends. If an operation to change process modes occurs even during the process in FIG. 4, the process in FIG. 3 is performed.

[1.5 Operation Effects]

As described above, the image sensor 10 can allow the DSP 14 to operate in a software manner by allowing the DSP 14 to run a DNN in a chip, thereby performing a complicated process through the DSP process using a DNN in one chip. The image sensor 10 can change the frame rate dynamically depending on whether the DSP process is performed in accordance with the process mode, achieve higher speed of processing, and improve the user's usability. The image sensor 10 can control the start of the DSP process with an enable signal and therefore can suppress whether to perform the readout process of an image from the imager 11 and the DSP process concurrently, thereby suppressing occurrence of noise and suppressing image quality deterioration of the image sensor.

2. Modification (1) to First Embodiment

In the foregoing first embodiment, suppression of noise occurrence and noise reduction are performed by controlling the execution period of the DSP process by the DSP 14 with an enable signal. However, the present invention is not limited thereto. When noise is acceptable to some degree, for example, in image capturing in bright light, the image readout process and the DSP process may be performed concurrently. An example of performing the image readout process and the DSP process concurrently is described here.

Figure 5:
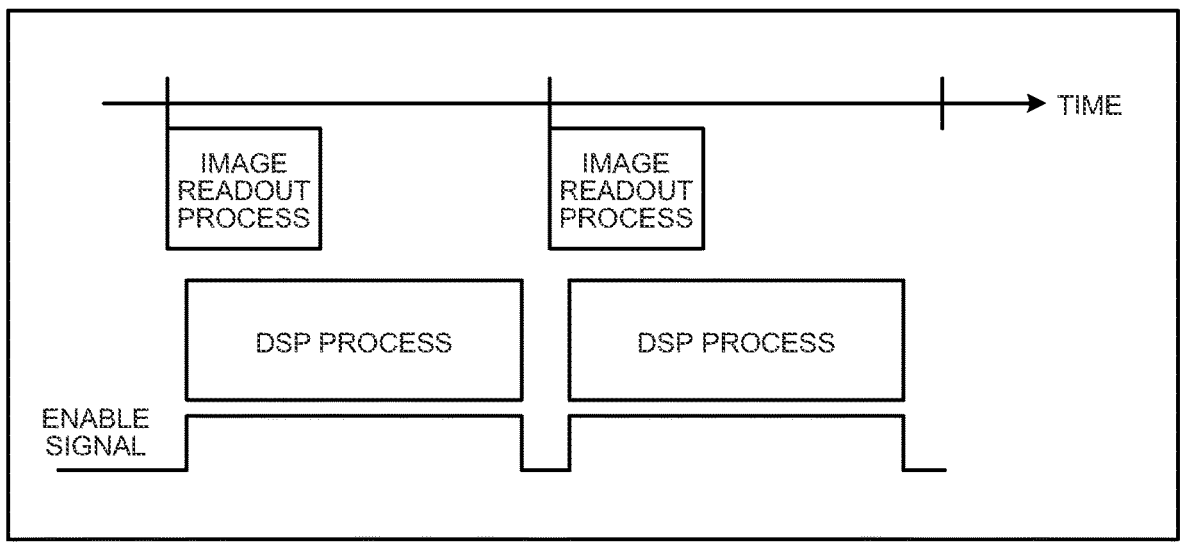
FIG. 5 is a diagram illustrating a modification to the first embodiment.

FIG. 5 is a diagram illustrating a modification to the first embodiment. As illustrated in FIG. 5, when noise is acceptable to some degree in a state in which the first process mode of performing the image readout process and the DSP process is selected, the image readout process and the DSP process can be performed concurrently.

For example, when a predetermined condition is satisfied, the controller 12 changes a period in which the enable signal is activated. Specifically, as illustrated in FIG. 5, after the image readout process is started, the controller 12 changes the enable signal to ACTIVE during execution of the image readout process to allow the image readout process and the DSP process to be performed concurrently. As used herein "when a predetermined condition is satisfied" may refer to when noise is acceptable to some degree, for example, when the quantity of light equal to or larger than a preset threshold is obtained.

The second process mode illustrated in FIG. 5 can be applied to, for example, a monitoring camera for keeping an eye on infants and elderly persons since the image data readout process by the controller 12 can be temporally overlapped with the DSP process by the DSP 14 for data based on the image data. Specifically, while the first process mode illustrated in FIG. 2A is selected, the controller 12 reads an image from the imager 11, and the DSP 14 performs human presence detection from the read image. When the DSP 14 detects a person, the controller 12 sets an ACTIVE period of the enable signal to increase the frame rate compared with the first process mode. As a result, the DSP 14 can detect the posture of the person appearing in the image, from an image, concurrently with the image readout by the controller 12. That is, the image readout process with a small process load and the posture detection with a large process load are performed concurrently. In this way, the image readout process and the human presence detection by the DSP 14 are performed until a monitoring target is detected, and upon detection of the monitoring target, more sophisticated detection of posture of the monitoring target can be performed. The application processor 20 therefore can achieve both of the early detection of a monitoring target and the detection of motion of the detected monitoring target. When a person is no longer detected, the first process mode returns.

In this way, in the second process mode illustrated in FIG. 5, when a certain detection target is detected by the DSP process by the DSP 14 in the first process mode, the DSP process by the DSP 14 can be performed at the second frame rate that is the same frame rate as the first frame rate in the first process mode. When noise is acceptable to some degree, therefore, the DSP process can be started without waiting for completion of the image readout process. Consequently, even when the calculation volume of the DSP process is large and a long process time is required, reduction in the frame rate can be avoided, or, if the frame rate is reduced, the amount of reduction can be reduced.

3. Modification (2) to First Embodiment

In the foregoing embodiment, in the first process mode, the image readout process and the DSP process are performed in different time slots. However, the present invention is not limited to thereto. For example, when the DSP process is light and the process time is short, the first process mode can include a normal mode at the first frame rate (FIG. 2A) and a speed priority mode at a frame rate that is higher than the first frame rate.

Figure 6:
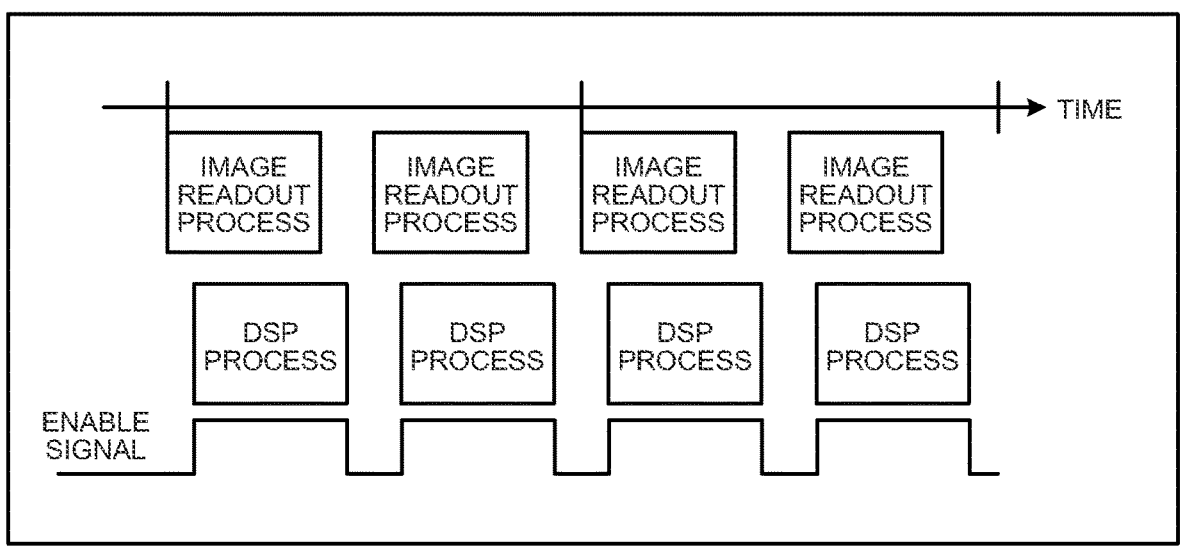
FIG. 6 is a diagram illustrating a modification to the first embodiment.

FIG. 6 is a diagram illustrating a modification to the first embodiment. As illustrated in FIG. 6, in the speed priority mode, the image readout process and the DSP process are performed concurrently, and upon completion of the DSP process, the next image readout is performed without delay. That is, in the second process mode illustrated in FIG. 6, the DSP process is performed at the second frame rate that is higher than the first frame rate in the first process mode when a certain detection target is detected by the DSP process in the first process mode.

When the speed priority mode is preset by the user, for example, the controller 12 activates the enable signal during execution of the image readout process to allow the DSP process to be performed concurrently. Subsequently, upon completion of the DSP process, the controller 12 immediately inactivates the enable signal and allows the next image readout process to be performed.

The process mode illustrated in FIG. 6 can be applied to image processing for home-use games and Internet games. Specifically, while the first process mode illustrated in FIG. 2A is selected, the controller 12 reads out a game image reflecting the user's operation from the imager 11, and the DSP 14 detects a pose specific to the read game image. Then, when the DSP 14 detects a specific pose, the controller 12 sets the speed priority mode illustrated in FIG. 6 to increase the frame rate. As a result, the readout of a game image by the controller 12 and the pose detection by the DSP 14 can be performed simultaneously. When a killer move using a gesture is made in a game, the application processor 20 can perform pose detection at high speed and determine a motion necessary for the killer move at high speed. When a specific motion is no longer detected, the first process mode returns.

In this way, even when the DSP process is performed similarly to the first process mode (FIG. 2A), the process can be performed at a frame rate similar to that in the second process mode (FIG. 2B), thereby achieving higher speed of the process.

4. Chip Configuration of Image Sensor

An example of the chip configuration of the image sensor 10 illustrated in FIG. 1 will now be described in detail below with reference to the drawings.

Figure 7:
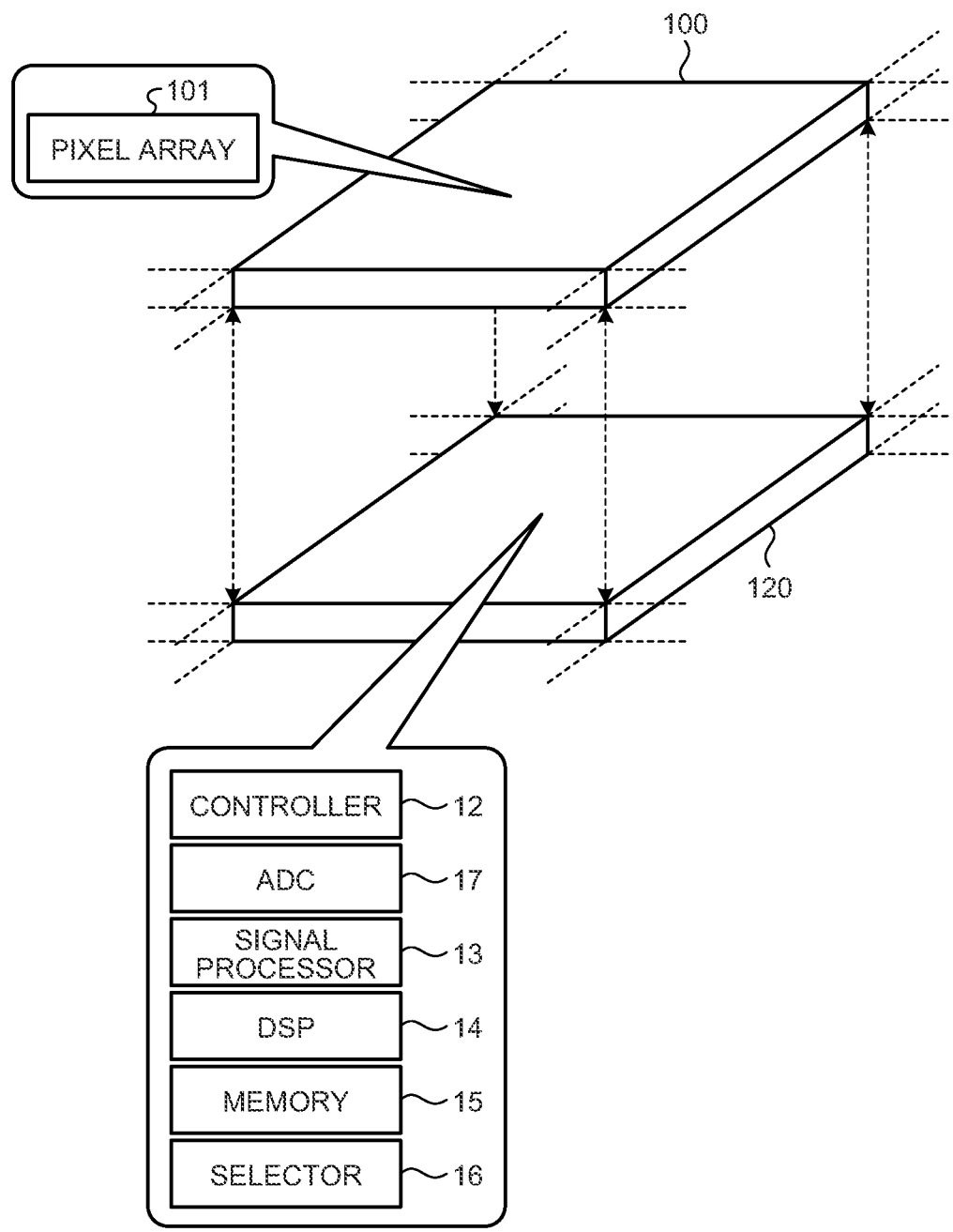
FIG. 7 is a diagram illustrating a chip configuration example of an image sensor according to the present embodiment.

FIG. 7 is a diagram illustrating a chip configuration of the image sensor according to the present embodiment. As illustrated in FIG. 7, the image sensor 10 has a stack structure in which a first substrate (die) 100 shaped like a quadrangular flat plate and a second substrate (die) 120 similarly shaped like a quadrangular flat plate are bonded together.

The first substrate 100 and the second substrate may have the same size, for example. The first substrate 100 and the second substrate 120 each may be a semiconductor substrate such as a silicon substrate.

In the first substrate 100, in the configuration of the image sensor 10 illustrated in FIG. 1, the pixel array 101 of the imager 11 is arranged. A part or the whole of the optical system 104 may be provided on a chip in the first substrate 100.

In the second substrate 120, in the configuration of the image sensor 10 illustrated in FIG. 1, the ADC 17, the controller 12, the signal processor 13, the DSP 14, the memory 15, and the selector 16 are arranged. A not-illustrated interface circuit, driver circuit, and the like may be arranged in the second substrate 120.

The first substrate 100 and the second substrate 120 may be bonded together by chip-on-chip (CoC) technology in which the first substrate 100 and the second substrate 120 are individually diced into chips, and these diced first substrate 100 and second substrate 120 are bonded together, or by chip-on-wafer (CoW) technology in which one of the first substrate 100 and the second substrate 120 (for example, the first substrate 100) is diced into a chip, and the diced first substrate 100 is bonded to the second substrate 120 before dicing (that is, in a wafer state), or by wafer-on-wafer (WoW) technology in which the first substrate 100 and the second substrate 120 both in a wafer state are bonded together.

For example, plasma joining can be used as a joining process between the first substrate 100 and the second substrate 120. However, the present invention is not limited thereto and a variety of joining processes may be used.

5. Layout Example

Figure 8:
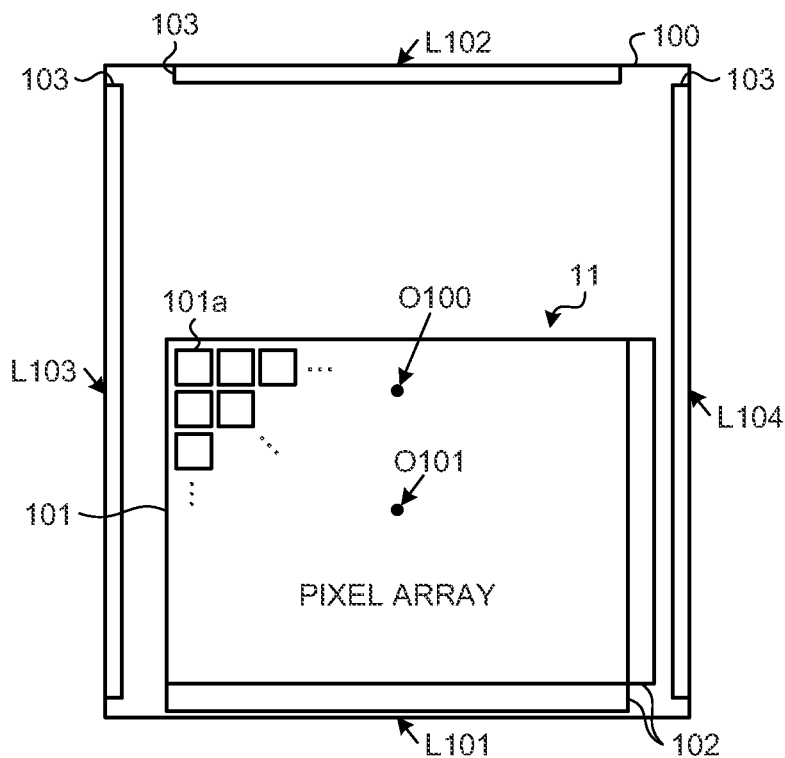
FIG. 8 is a diagram illustrating a layout example according to the present embodiment.
Figure 9:
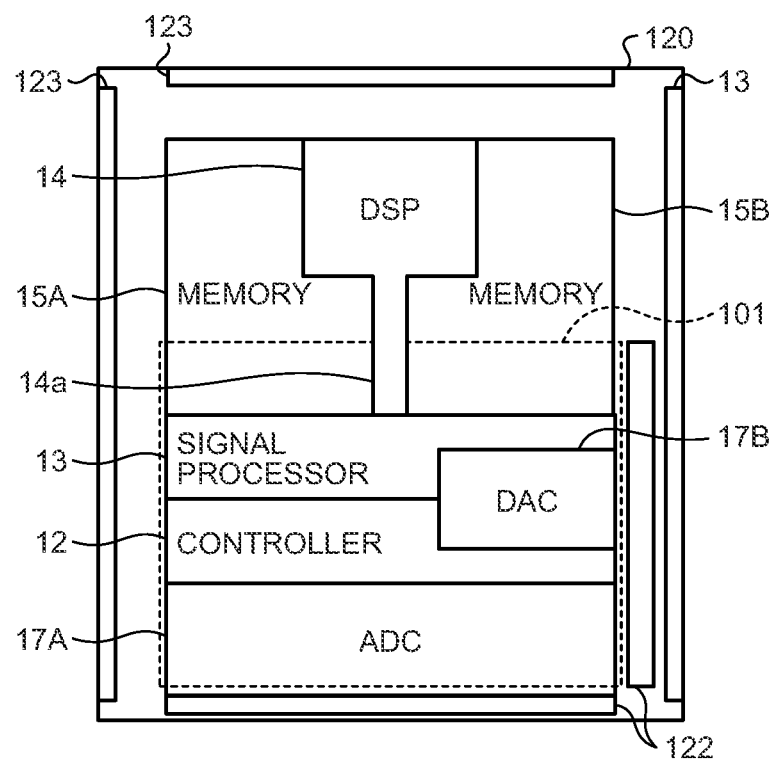
FIG. 9 is a diagram illustrating a layout example according to the present embodiment.

FIG. 8 and FIG. 9 are diagrams for explaining a layout example according to the present embodiment. FIG. 8 illustrates a layout example of the first substrate 100, and FIG. 9 illustrates a layout example of the second substrate 120.

[5-1. Layout Example of First Substrate]

As illustrated in FIG. 8, in the first substrate 100, in the configuration of the image sensor 10 illustrated in FIG. 1, the pixel array 101 of the imager 11 is arranged. When a part or the whole of the optical system 104 is mounted on the first substrate 100, it is provided at a position corresponding to the pixel array 101.

The pixel array 101 is arranged off-center to one side L101 among four sides L101 to L104 of the first substrate 100. In other words, the pixel array 101 is arranged such that its center O101 is more proximate to the side L101 than the center O100 of the first substrate 100. When the surface having the pixel array 101 in the first substrate 100 is rectangular, the side L101 may be, for example, a shorter side. However, the present invention is not limited thereto, and the pixel array 101 may be arranged off-center to a longer side.

In a region proximate to the side L101 among four sides of the pixel array 101, in other words, a region between the side L101 and the pixel array 101, a TSV array 102 is provided, in which a plurality of through silicon vias (hereinafter referred to as TSVs) passing through the first substrate 100 are arranged as wiring for electrically connecting each unit pixel 101a in the pixel array 101 to the ADC 17 arranged in the second substrate 120. In this way, the TSV array 102 is provided in proximity to the side L101 proximate to the pixel array 101 to ensure a space for each part such as the ADC 17 in the second substrate 120.

The TSV array 102 may also be provided in a region proximate to one side L104 (or may be the side L103) of two sides L103 and L104 intersecting the side L101, in other words, in a region between the side L104 (or the side L103) and the pixel array 101.

A pad array 103 having a plurality of pads arranged linearly is provided on each of the sides L102 and L103 on which the pixel array 101 is not arranged off-center, among four sides L101 to L104 of the first substrate 100. The pads included in the pad array 103 include, for example, a pad (also referred to as power supply pin) receiving power supply voltage for analog circuits such as the pixel array 101 and the ADC 17, a pad (also referred to as power supply pin) receiving power supply voltage for digital circuits such as the signal processor 13, the DSP 14, the memory 15, the selector 16, and the controller 12, a pad (also referred to as signal pin) for interfaces such as a mobile industry processor interface (MIPI) and a serial peripheral interface (SPI), and a pad (also referred to as signal pin) for input/output of clock and data. Each pad is electrically connected to, for example, an external power supply circuit or an interface circuit through a wire. It is preferable that each pad array 103 and the TSV array 102 are sufficiently spaced apart to such a degree that influences of reflection of signals from the wire connected to each pad in the pad array 103 can be ignored.

[5-2. Layout Example of Second Substrate]

On the other hand, as illustrated in FIG. 9, in the second substrate 120, in the configuration of the image sensor 10 illustrated in FIG. 1, the ADC 17, the controller 12, the signal processor 13, the DSP 14, and the memory 15 are arranged. In the first layout example, the memory 15 is divided into two regions: a memory 15A and a memory 15B. Similarly, the ADC 17 is divided into two regions: an ADC 17A and a digital-to-analog converter (DAC) 17B. The DAC 17B supplies a reference voltage for AD conversion to the ADC 17A and, broadly speaking, is included in a part of the ADC 17. Although not illustrated in FIG. 8, the selector 16 is also arranged on the second substrate 120.

The second substrate 120 also has wiring 122 in contact with and electrically connected to the TSVs in the TSV array 102 passing through the first substrate 100 (hereinafter simply referred to as TSV array 102), and a pad array 123 in which a plurality of pads electrically connected to the pads in the pad array 103 of the first substrate 100 are arranged linearly.

For the connection between the TSV array 102 and the wiring 122, for example, the following technology can be employed: twin TSV technology in which two TSVs, namely, a TSV provided in the first substrate 100 and a TSV provided from the first substrate 100 to the second substrate 120 are connected with the chip facing out, or shared TSV technology in which a shared TSV provided from the first substrate 100 to the second substrate 120 provides connection. However, the present invention is not limited thereto, and a variety of connection modes can be employed. Examples include Cu—Cu bonding in which copper (Cu) exposed on the joint surface of the first substrate 100 and Cu exposed on the joint surface of the second substrate 120 are joined.

The connection mode between the pads in the pad array 103 on the first substrate 100 and the pads in the pad array 123 of the second substrate 120 may be, for example, wire bonding. However, the present invention is not limited thereto, and connection modes such as through holes and castellation may be employed.

In a layout example of the second substrate 120, for example, the ADC 17A, the signal processor 13, and the DSP 14 are arranged in order from the upstream side along the flow of a signal read out from the pixel array 101, where the upstream side is the vicinity of the wiring 122 connected to the TSV array 102. That is, the ADC 17A to which a pixel signal read out from the pixel array 101 is initially input is arranged in the vicinity of the wiring 122 on the most upstream side, next the signal processor 13 is arranged, and the DSP 14 is arranged in a region farthest from the wiring 122. Such a layout in which the ADC 17 to the DSP 14 are arranged from the upstream side along the flow of a signal can shorten the wiring connecting the parts. This layout leads to reduction in signal delay, reduction in signal propagation loss, improvement of the S/N ratio, and lower power consumption.

The controller 12 is arranged, for example, in the vicinity of the wiring 122 on the upstream side. In FIG. 8, the controller 12 is arranged between the ADC 17A and the signal processor 13. Such a layout leads to reduction in signal delay, reduction in signal propagation loss, improvement of the S/N ratio, and lower power consumption when the controller 12 controls the pixel array 101. Advantageously, the signal pin and the power supply pin for analog circuits can be collectively arranged in the vicinity of the analog circuits (for example, in the lower side of FIG. 8), the remaining signal pin and power supply pin for digital circuits can be collectively arranged in the vicinity of the digital circuits (for example, in the upper side of FIG. 8), or the power supply pin for analog circuits and the power supply pin for digital circuits can be sufficiently spaced apart from each other.

In the layout illustrated in FIG. 8, the DSP 14 is arranged on the side opposite to the ADC 17A on the most downstream side. With such a layout, in other words, the DSP 14 can be arranged in a region not overlapping with the pixel array 101 in the stacking direction of the first substrate 100 and the second substrate 120 (hereinafter simply referred to as top-bottom direction).

In this way, in the configuration in which the pixel array 101 and the DSP 14 are not superimposed in the top-bottom direction, intrusion of noise produced due to signal processing by the DSP 14 into the pixel array 101 can be reduced. As a result, even when the DSP 14 operates as a processing unit that performs computation based on a pre-trained model, intrusion of noise resulting from signal processing by the DSP 14 into the pixel array 101 can be reduced, and consequently, an image with less deterioration in quality can be acquired.

The DSP 14 and the signal processor 13 are connected by an interconnect 14a configured with a part of the DSP 14 or a signal line. The selector 16 is arranged, for example, in the vicinity of the DSP 14. When the interconnect 14a is a part of the DSP 14, the DSP 14 may partially overlap with the pixel array 101 in the top-bottom direction. However, even in such a case, compared with when the whole of the DSP 14 is superimposed on the pixel array 101 in the top-bottom direction, intrusion of noise into the pixel array 101 can be reduced.

Memories 15A and 15B are arranged, for example, so as to surround the DSP 14 from three directions. In such an arrangement of the memories 15A and 15B surrounding the DSP 14, the distance of wiring between each memory element in the memory 15 and the DSP 14 can be averaged while the distance can be reduced as a whole. Consequently, signal delay, signal propagation loss, and power consumption can be reduced when the DSP 14 accesses the memory 15.

The pad array 123 is arranged, for example, at a position on the second substrate 120 corresponding to the pad array 103 of the first substrate 100 in the top-bottom direction. Here, among the pads included in the pad array 123, a pad positioned in the vicinity of the ADC 17A is used for propagation of power supply voltage for analog circuits (mainly the ADC 17A) or an analog signal. On the other hand, a pad positioned in the vicinity of the controller 12, the signal processor 13, the DSP 14, or the memories 15A and 15B is used for propagation of power supply voltage for digital circuits (mainly, the controller 12, the signal processor 13, the DSP 14, the memories 15A and 15B) and a digital signal. Such a pad layout can reduce the distance of wiring connecting the pads to the parts. This layout leads to reduction in signal delay, reduction in propagation loss of signals and power supply voltage, improvement of the S/N ratio, and lower power consumption.

6. Other Embodiments

The process according to the foregoing embodiments may be carried out in various manners in addition to the foregoing embodiments.

The numerical values such as frame rate and predetermined time described in the foregoing embodiments are illustrative only and can be changed as desired. The contents of the DSP process described in the embodiments are also illustrative only, and a variety of processes using a learning model can be employed. The DSP process may be performed when the enable signal is inactive (OFF), and the image readout process may be performed when the enable signal is active (ON).

In the foregoing embodiments, a learning model that has learned via a DNN is described by way of example. However, in addition to DNNs, various neural networks such as recurrent neural networks (RNNs) and convolutional neural networks (CNNs) can be used. The present invention is not limited to a learning model using a DNN and the like, and learning models that have learned through other various machine learning such as decision trees and support vector machines can be used.

The information including process procedures, control procedures, specific names, a variety of data and parameters shown in the description and the drawings can be changed as desired unless otherwise specified. The specific examples, distributions, and numerical values described in the examples are illustrative only and can be changed as desired.

The constituent elements in the devices illustrated in the drawings are functional and conceptual and are not necessarily physically configured as depicted in the drawings. That is, a specific manner of distribution and integration of the devices is not limited to the one illustrated in the drawings, and the whole or a part thereof may be functionally or physically distributed or integrated in any units, depending on a variety of loads and use situations. For example, the controller 12 and the signal processor 13 illustrated in FIG. 1 may be integrated.

7. Application to Movable Body

The technique according to the present disclosure (the present technique) is applicable to a variety of products. For example, the technique according to the present disclosure may be implemented as a device mounted on any type of movable bodies, such as automobiles, electric vehicles, hybrid electric vehicles, motorcycles, bicycles, personal mobility devices, airplanes, drones, vessels and ships, and robots.

Figure 10:
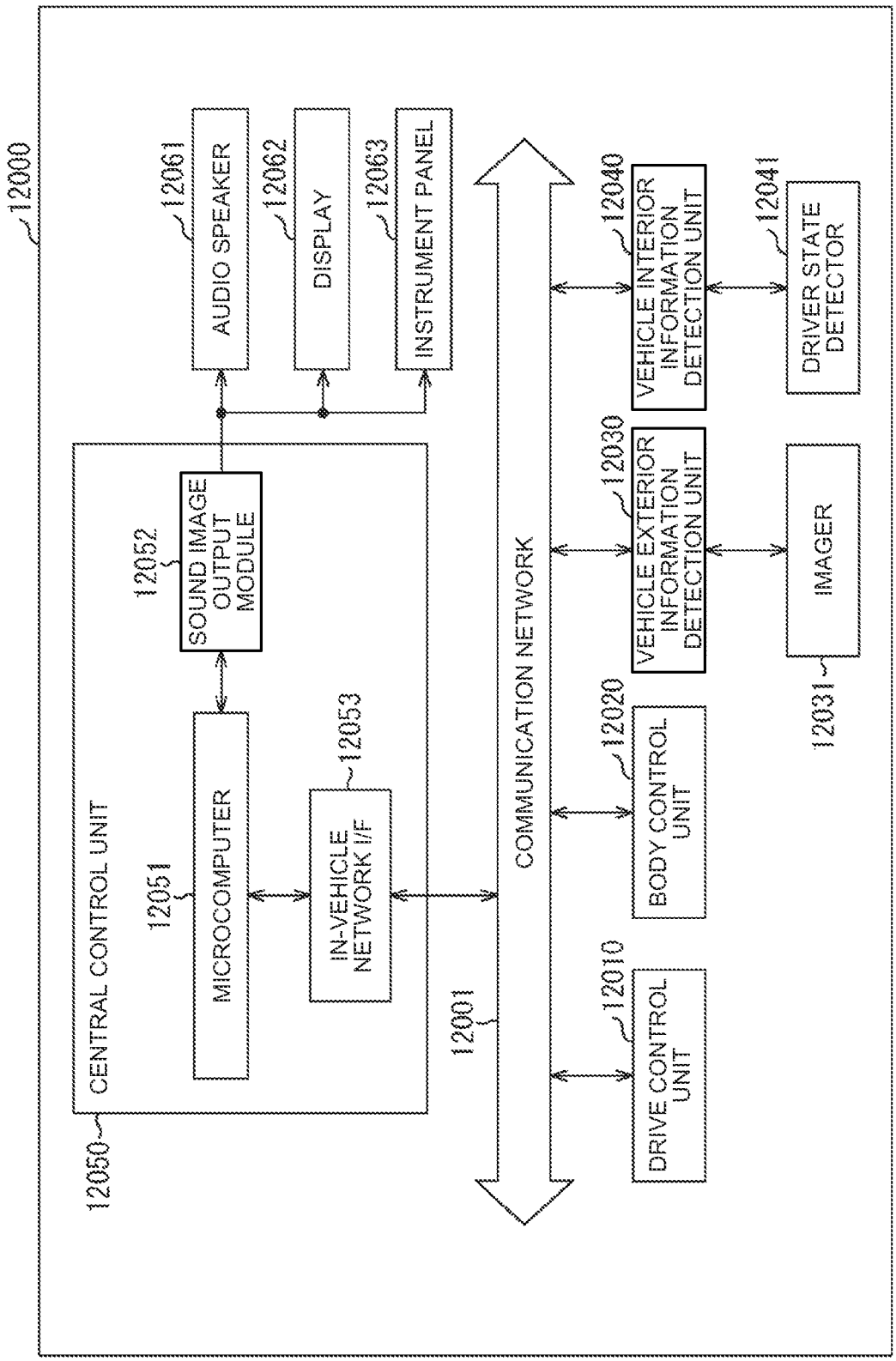
FIG. 10 is a block diagram illustrating an example of the overall configuration of a vehicle control system.

FIG. 10 is a block diagram illustrating an example of the overall configuration of a vehicle control system that is an example of a movable body control system to which the technique according to the present disclosure is applicable.

A vehicle control system 12000 includes a plurality of electronic control units connected through a communication network 12001. In the example illustrated in FIG. 10, the vehicle control system 12000 includes a drive control unit 12010, a body control unit 12020, a vehicle exterior information detection unit 12030, a vehicle interior information detection unit 12040, and a central control unit 12050. As a functional configuration of the central control unit 12050, a microcomputer 12051, a sound image output module 12052, and an in-vehicle network I/F (interface) 12053 are illustrated.

The drive control unit 12010 controls operation of devices related to a drive system of a vehicle in accordance with a variety of computer programs. For example, the drive control unit 12010 functions as a control device for a drive force generating device for generating drive force of the vehicle, such as an internal combustion engine or a drive motor, a drive force transmission mechanism for transmitting drive force to the wheels, a steering mechanism for adjusting the steering angle of the vehicle, and a braking device for generating braking force of the vehicle.

The body control unit 12020 controls operation of a variety of devices installed in the vehicle body in accordance with a variety of computer programs. For example, the body control unit 12020 functions as a control device for a keyless entry system, a smart key system, a power window device, or a variety of lamps such as head lamps, rear lamps, brake lamps, turn signals, and fog lamps. In this case, the body control unit 12020 may receive radio waves transmitted from a portable device alternative to a key or signals from a variety of switches. The body control unit 12020 accepts input of the radio waves or signals and controls a door lock device, a power window device, a lamp, and the like of the vehicle.

The vehicle exterior information detection unit 12030 detects information on the outside of the vehicle equipped with the vehicle control system 12000. For example, an imager 12031 is connected to the vehicle exterior information detection unit 12030. The vehicle exterior information detection unit 12030 allows the imager 12031 to capture an image of the outside of the vehicle and receives the captured image. The vehicle exterior information detection unit 12030 may perform an object detection process or a distance detection process for persons, vehicles, obstacles, signs, or characters on roads, based on the received image.

The imager 12031 is an optical sensor that receives light and outputs an electrical signal corresponding to the quantity of received light of the light. The imager 12031 may output an electrical signal as an image or output as information on a measured distance. Light received by the imager 12031 may be visible light or invisible light such as infrared rays.

The vehicle interior information detection unit 12040 detects information on the inside of the vehicle. The vehicle interior information detection unit 12040 is connected to, for example, a driver state detector 12041 that detects a state of the driver. The driver state detector 12041 includes, for example, a camera for taking an image of the driver, and the vehicle interior information detection unit 12040 may calculate the degree of fatigue or the degree of concentration of the driver or may determine whether the driver falls asleep, based on detection information input from the driver state detector 12041.

The microcomputer 12051 can compute a control target value for the drive force generating device, the steering mechanism, or the braking device, based on information on the inside and outside of the vehicle acquired by the vehicle exterior information detection unit 12030 or the vehicle interior information detection unit 12040, and output a control command to the drive control unit 12010. For example, the microcomputer 12051 can perform coordination control for the purpose of function implementation of advanced driver assistance systems (ADAS), including collision avoidance or shock mitigation of the vehicle, car-following drive based on the distance between vehicles, vehicle speed-keeping drive, vehicle collision warning, and lane departure warning.

The microcomputer 12051 can perform coordination control for the purpose of, for example, autonomous driving, in which the drive force generating device, the steering mechanism, or the braking device is controlled based on information on the surroundings of the vehicle acquired by the vehicle exterior information detection unit 12030 or the vehicle interior information detection unit 12040 to enable autonomous driving without depending on the operation by the driver.

The microcomputer 12051 can output a control command to the body control unit 12020, based on information on the outside of the vehicle acquired by the vehicle exterior information detection unit 12030. For example, the microcomputer 12051 can perform coordination control for the antidazzle purpose, for example, by controlling the head lamps in accordance with the position of a vehicle ahead or an oncoming vehicle detected by the vehicle exterior information detection unit 12030 to switch high beams to low beams.

The sound image output module 12052 transmits an output signal of at least one of sound and image to an output device capable of visually or aurally giving information to a passenger in the vehicle or the outside of the vehicle. In the example in FIG. 10, an audio speaker 12061, a display 12062, and an instrument panel 12063 are illustrated as the output device. The display 12062 may include, for example, at least one of an on-board display and a head-up display.

Figure 11:
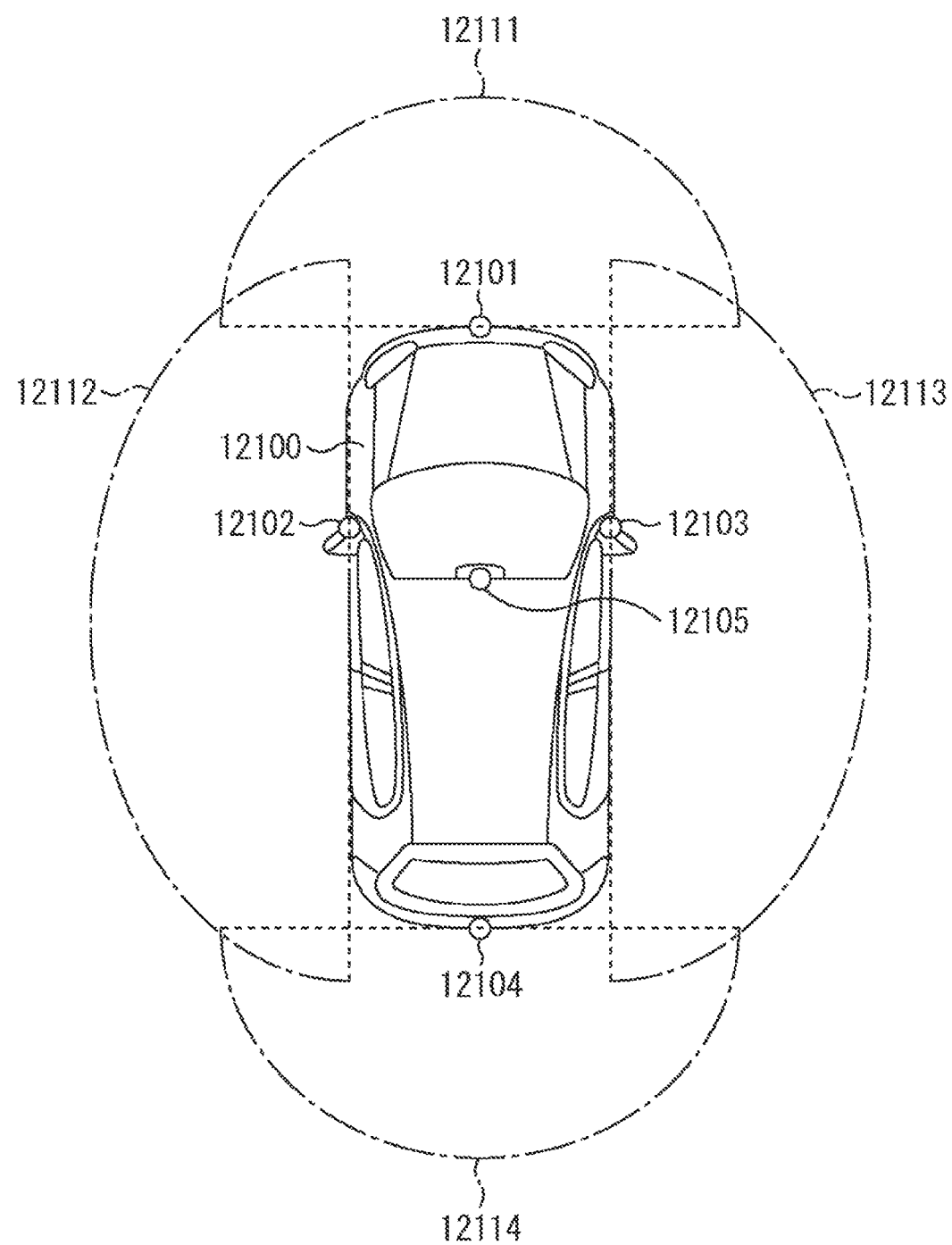
FIG. 11 is a diagram illustrating an example of the installation position of a vehicle exterior information detector and an imager.

FIG. 11 is a diagram illustrating an example of the installation position of the imager 12031.

In FIG. 11, imagers 12101, 12102, 12103, 12104, and 12105 are provided as the imager 12031.

The imagers 12101, 12102, 12103, 12104, and 12105 are provided, for example, at positions such as front nose, side mirrors, rear bumper, back door of a vehicle 12100, and an upper portion of the front glass inside the vehicle. The imager 12101 provided at the front nose and the imager 12105 provided at the upper portion of the front glass inside the vehicle mainly acquire an image in front of the vehicle 12100. The imagers 12102 and 12103 provided at the side mirrors mainly acquire images on the sides of the vehicle 12100. The imager 12104 provided at the rear bumper or the back door mainly acquires an image behind the vehicle 12100. The imager 12105 provided at the upper portion of the front glass in the vehicle interior is mainly used for detecting a vehicle ahead, pedestrians, obstacle, traffic signs, road signs, traffic lanes, and the like.

FIG. 11 illustrates an example of the imaging ranges of the imagers 12101 and 12104. An imaging range 12111 indicates an imaging range of the imager 12101 provided at the front nose, imaging ranges 12112 and 12113 indicate the imaging ranges of the imagers 12102 and 12103 provided at the side mirrors, and an imaging range 12114 indicates the imaging range of the imager 12104 provided at the rear bumper or the back door. For example, a bird's eye view of the vehicle 12100 viewed from above can be obtained by superimposing image data captured by the imagers 12101 and 12104.

At least one of the imagers 12101 and 12104 may have a function of acquiring distance information. For example, at least one of the imagers 12101 and 12104 may be a stereo camera including a plurality of image sensors or may be an image sensor having a pixel for phase difference detection.

For example, the microcomputer 12051 can obtain the distance to a three-dimensional object within the imaging range 12111 or 12114 and a temporal change of this distance (relative speed to the vehicle 12100), based on distance information obtained from the imager 12101 or 12104, to specifically extract a three-dimensional object closest to the vehicle 12100 on the path of travel and traveling at a predetermined speed (for example, 0 km/h or more) in substantially the same direction as the vehicle 12100, as a vehicle ahead. In addition, the microcomputer 12051 can preset a distance between vehicles to be kept in front of a vehicle ahead and perform, for example, automatic braking control (including car-following stop control) and automatic speed-up control (including car-following startup control). In this way, coordination control can be performed, for example, for the purpose of autonomous driving in which the vehicle runs autonomously without depending on the operation by the driver.

For example, the microcomputer 12051 can classify three-dimensional object data on a three-dimensional object into two-wheel vehicle, standard-sized vehicle, heavy vehicle, pedestrian, utility pole, or any other three-dimensional object, based on the distance information obtained from the imager 12101 or 12104, and can use the extracted data for automatic avoidance of obstacles. For example, the microcomputer 12051 identifies an obstacle in the surroundings of the vehicle 12100 as an obstacle visible to the driver of the vehicle 12100 or as an obstacle hardly visible. The microcomputer 12051 then determines a collision risk indicating the degree of risk of collision with each obstacle and, when the collision risk is equal to or higher than a setting value and there is a possibility of collision, outputs an alarm to the driver through the audio speaker 12061 or the display 12062, or performs forced deceleration or avoidance steering through the drive control unit 12010, thereby implementing drive assistance for collision avoidance.

At least one of the imagers 12101 and 12104 may be an infrared camera that detects infrared rays. For example, the microcomputer 12051 can recognize a pedestrian by determining whether a pedestrian exists in the captured image by the imager 12101 or 12104. Such recognition of pedestrians is performed, for example, through the procedure of extracting feature points in the captured image by the imager 12101 or 12104 serving as an infrared camera and the procedure of performing pattern matching with a series of feature points indicating the outline of an object to determine whether the object is a pedestrian. When the microcomputer 12051 determines that a pedestrian exists in the captured image by the imager 12101 or 12104 and recognizes a pedestrian, the sound image output module 12052 controls the display 12062 such that a rectangular outline for highlighting the recognized pedestrian is superimposed. The sound image output module 12052 may control the display 12062 such that an icon indicating a pedestrian appears at a desired position.

An example of the vehicle control system to which the technique according to the present disclosure is applicable has been described above. The technique according to the present disclosure is applicable to the imager 12031 and the like in the configuration described above. When the technique according to the present disclosure is applied to the imager 12031 and the like, miniaturization of the imager 12031 and the like can be achieved, thereby facilitating design of the interior and the exterior of the vehicle 12100. When the technique according to the present disclosure is applied to the imager 12031 and the like, a clear image with reduced noise can be acquired to provide a driver with a more visible image. Consequently, the driver's fatigue can be alleviated.

8. Application to Endoscopic Surgery System

The technique according to the present disclosure (the present technique) is applicable to a variety of products. For example, the technique according to the present disclosure may be applied to an endoscopic surgery system.

Figure 12:
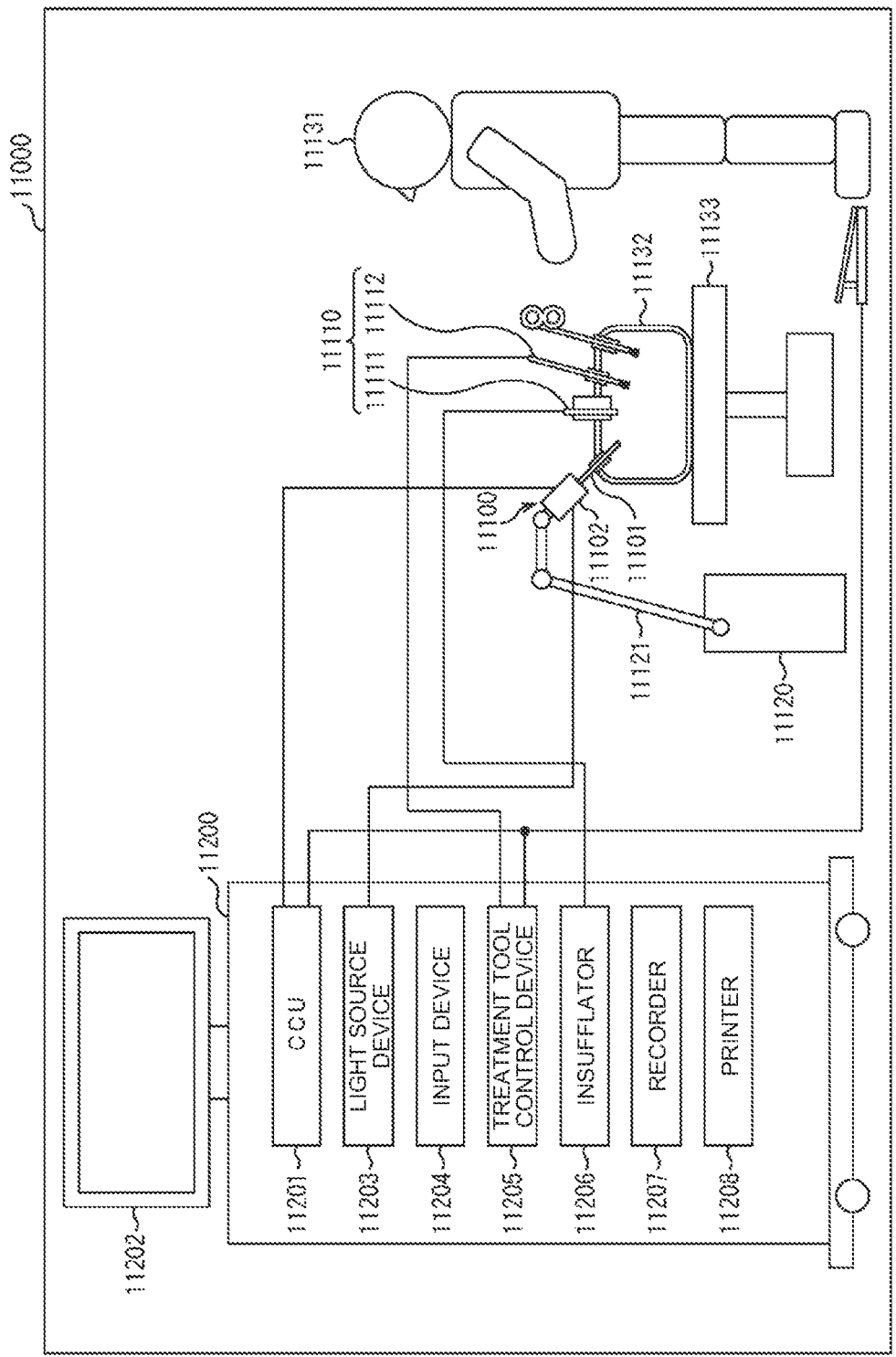
FIG. 12 is a diagram illustrating an example of the overall configuration of an endoscopic surgery system.

FIG. 12 is a diagram illustrating an example of the overall configuration of an endoscopic surgery system to which the technique according to the present disclosure (the present technique) is applicable.

FIG. 12 illustrates a situation in which an operator (doctor) 11131 uses an endoscopic surgery system 11000 to perform an operation on a patient 11132 on a patient bed 11133. As illustrated in the drawing, the endoscopic surgery system 11000 includes an endoscope 11100, other surgical instruments 11110 such as an insufflation tube 11111 and an energy treatment tool 11112, a support arm device 11120 supporting the endoscope 11100, and a cart 11200 carrying a variety of devices for endoscopic surgery.

The endoscope 11100 includes a barrel 11101 having a region of a predetermined length from its tip end to be inserted into the body cavity of the patient 11132, and a camera head 11102 connected to the base end of the barrel 11101. In the example illustrated in the drawing, the endoscope 11100 is a rigid borescope having a rigid barrel 11101. However, the endoscope 11100 may be configured as a soft borescope having a soft barrel.

The tip end of the barrel 11101 has an opening having an objective lens fitted therein. A light source device 11203 is connected to the endoscope 11100. Light generated by the light source device 11203 is propagated to the tip end of the barrel through a light guide extending inside the barrel 11101 and irradiates an observation target in the body cavity of the patient 11132 through the objective lens. The endoscope 11100 may be a forward-viewing endoscope or may be a forward-oblique viewing endoscope or a side-viewing endoscope.

An optical system and an image sensor are provided inside the camera head 11102. Reflected light (observation light) from an observation target is collected by the optical system onto the image sensor. The observation light is converted to electricity by the image sensor to generate an electrical signal corresponding to the observation light, that is, an image signal corresponding to an observation image. The image signal is transmitted as RAW data to a camera control unit (CCU) 11201.

The CCU 11201 is configured with a central processing unit (CPU), a graphics processing unit (GPU), or the like to centrally control the operation of the endoscope 11100 and a display device 11202. The CCU 11201 receives an image signal from the camera head 11102 and performs a variety of image processing on the image signal, for example, a development process (demosaicing) for displaying an image based on the image signal.

The display device 11202 displays an image based on the image signal subjected to image processing by the CCU 11201, under the control of the CCU 11201.

The light source device 11203 is configured with a light source such as a light emitting diode (LED) and supplies the endoscope 11100 with radiation light in imaging a surgery site.

An input device 11204 is an input interface with the endoscopic surgery system 11000. The user can input a variety of information and instructions to the endoscopic surgery system 11000 through the input device 11204. For example, the user inputs an instruction to change the imaging conditions by the endoscope 11100 (the kind of radiation light, magnification, focal length, etc.).

A treatment tool control device 11205 controls actuation of the energy treatment tool 11112 for cauterization of tissues, incision, or sealing of blood vessels. An insufflator 11206 feeds gas into the body cavity through the insufflation tube 11111 to insufflate the body cavity of the patient 11132 in order to ensure the field of view with the endoscope 11100 and ensure a working space for the operator. A recorder 11207 is a device capable of recording a variety of information on surgery. A printer 11208 is a device capable of printing a variety of information on surgery in a variety of forms such as text, image, or graph.

The light source device 11203 that supplies the endoscope 11100 with radiation light in imaging a surgery site can be configured with, for example, a white light source such as an LED, a laser light source, or a combination thereof. When a white light source is configured with a combination of RGB laser light sources, the output power and the output timing of each color (each wavelength) can be controlled accurately, and, therefore, the white balance of the captured image can be adjusted in the light source device 11203. In this case, an observation target is irradiated time-divisionally with laser light from each of the RGB laser light sources, and actuation of the image sensor in the camera head 11102 is controlled in synchronization with the radiation timing, whereby an image corresponding to each of R, G, and B can be captured time-divisionally. According to this method, a color image can be obtained even without color filters in the image sensor.

The actuation of the light source device 11203 may be controlled such that the intensity of output light is changed every certain time. In synchronization with the timing of changing the intensity of light, the actuation of the image sensor in the camera head 11102 is controlled to acquire images time-divisionally, and the images are combined to generate an image with a high dynamic range free from blocked-up shadows and blown out highlights.

The light source device 11203 may be configured to supply light in a predetermined wavelength band corresponding to specific light observation. In specific light observation, for example, narrow band imaging is performed, which uses the wavelength dependency of light absorption in body tissues and applies light in a narrow band, compared with radiation light (that is, white light) in normal observation, to capture an image of predetermined tissues such as blood vessels in the outermost surface of mucosa. Alternatively, in specific light observation, fluorescence observation may be performed in which an image is acquired by fluorescence generated by radiation of excitation light. In fluorescence observation, for example, excitation light is applied to body tissues and fluorescence from the body tissues is observed (autofluorescence imaging), or a reagent such as indocyanine green (ICG) is locally injected to body tissues and excitation light corresponding to the fluorescence wavelength of the reagent is applied to the body tissues to obtain a fluorescence image. The light source device 11203 may be configured to supply narrow-band light and/or excitation light corresponding to such specific light observation.

Figure 13:
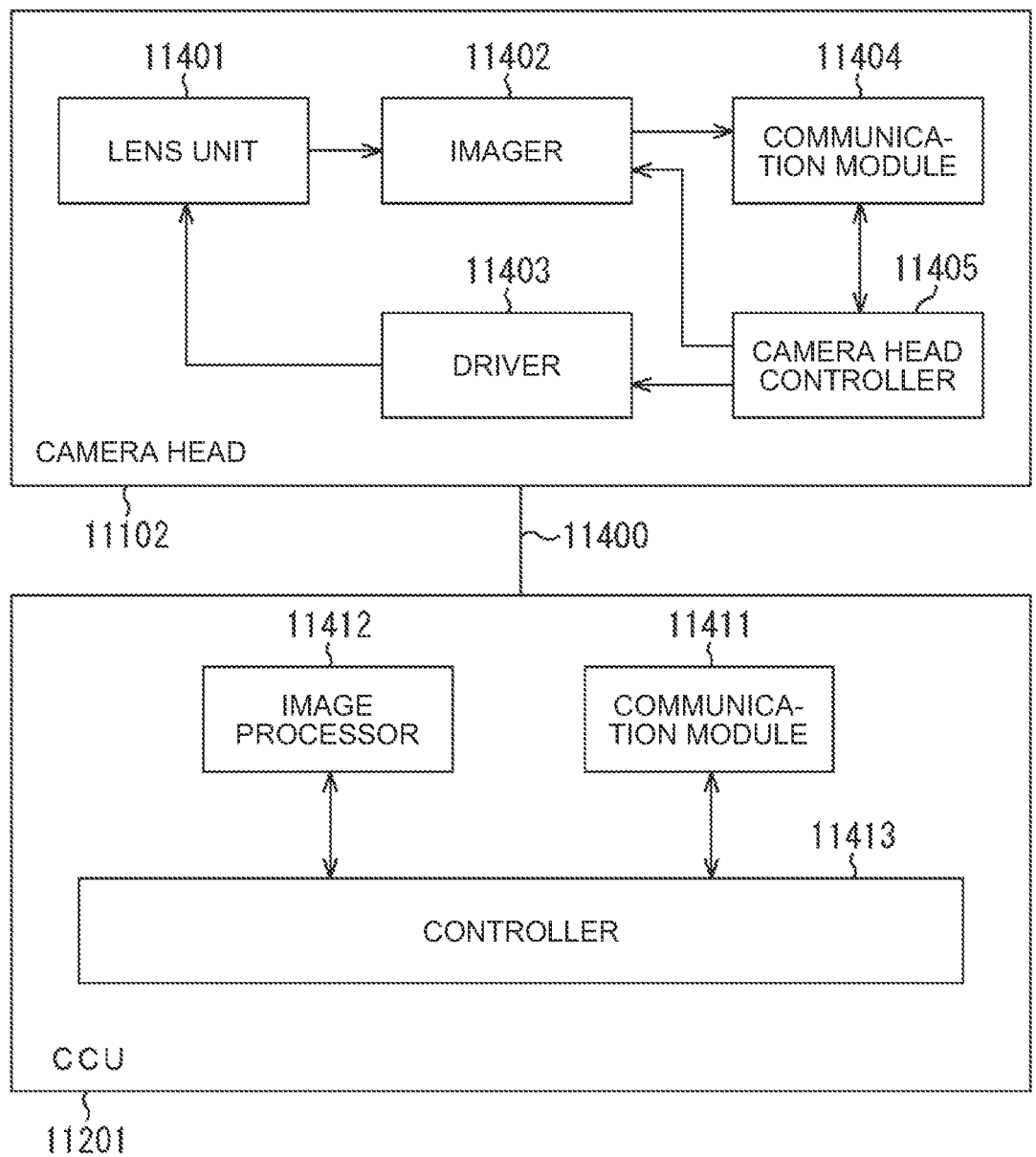
FIG. 13 is a block diagram illustrating an example of the functional configuration of a camera head and a CCU.

FIG. 13 is a block diagram illustrating an example of the functional configuration of the camera head 11102 and the CCU 11201 illustrated in FIG. 12.

The camera head 11102 includes a lens unit 11401, an imager 11402, a driver 11403, a communication module 11404, and a camera head controller 11405. The CCU 11201 includes a communication module 11411, an image processor 11412, and a controller 11413. The camera head 11102 and the CCU 11201 are connected to communicate with each other through a transmission cable 11400.

The lens unit 11401 is an optical system provided at a connection portion to the barrel 11101. Observation light taken in from the tip end of the barrel 11101 is propagated to the camera head 11102 and enters the lens unit 11401. The lens unit 11401 is configured with a combination of a plurality of lenses including a zoom lens and a focus lens.

The imager 11402 may be configured with one image sensor (called single sensor-type) or a plurality of image sensors (called multi sensor-type). When the imager 11402 is a multi-sensor construction, for example, image signals corresponding to R, G, and B may be generated by image sensors and combined to produce a color image. Alternatively, the imager 11402 may have a pair of image sensors for acquiring image signals for right eye and for left eye corresponding to three-dimensional (3D) display. The 3D display enables the operator 11131 to more accurately grasp the depth of living tissues in a surgery site. When the imager 11402 is a multi-sensor construction, several lines of lens units 11401 may be provided corresponding to the image sensors.

The imager 11402 is not necessarily provided in the camera head 11102. For example, the imager 11402 may be provided immediately behind the objective lens inside the barrel 11101.

The driver 11403 is configured with an actuator and moves the zoom lens and the focus lens of the lens unit 11401 by a predetermined distance along the optical axis under the control of the camera head controller 11405. The magnification and the focal point of a captured image by the imager 11402 thus can be adjusted as appropriate.

The communication module 11404 is configured with a communication device for transmitting/receiving a variety of information to/from the CCU 11201. The communication module 11404 transmits an image signal obtained from the imager 11402 as RAW data to the CCU 11201 through the transmission cable 11400.

The communication module 11404 receives a control signal for controlling actuation of the camera head 11102 from the CCU 11201 and supplies the received signal to the camera head controller 11405. The control signal includes, for example, information on imaging conditions, such as information specifying a frame rate of the captured images, information specifying an exposure value in imaging, and/or information specifying a magnification and a focal point of the captured image.

The image conditions such as frame rate, exposure value, magnification, and focal point may be specified as appropriate by the user or may be automatically set by the controller 11413 of the CCU 11201 based on the acquired image signal. In the latter case, the endoscope 11100 is equipped with an auto exposure (AE) function, an auto focus (AF) function, and an auto white balance (AWB) function.

The camera head controller 11405 controls actuation of the camera head 11102, based on a control signal received from the CCU 11201 through the communication module 11404.

The communication module 11411 is configured with a communication device for transmitting/receiving a variety of information to/from the camera head 11102. The communication module 11411 receives an image signal transmitted from the camera head 11102 through the transmission cable 11400.

The communication module 11411 transmits a control signal for controlling actuation of the camera head 11102 to the camera head 11102. The image signal and the control signal can be transmitted via electrical communication or optical communication.

The image processor 11412 performs a variety of image processing on the image signal that is RAW data transmitted from the camera head 11102.

The controller 11413 performs a variety of control on imaging of a surgery site and the like by the endoscope 11100 and display of a captured image obtained by imaging of a surgery site and the like. For example, the controller 11413 generates a control signal for controlling actuation of the camera head 11102.

The controller 11413 displays a captured image visualizing a surgery site and the like on the display device 11202, based on the image signal subjected to image processing by the image processor 11412. In doing so, the controller 11413 may recognize a variety of objects in the captured image using a variety of image recognition techniques. For example, the controller 11413 detects the shape of edge, color, and the like of an object included in the captured image to recognize a surgical instrument such as forceps, a specific living body site, bleeding, and mist in use of the energy treatment tool 11112. When displaying the captured image on the display device 11202, the controller 11413 may use the recognition result to superimpose a variety of surgery assisting information on the image of the surgery site. The surgery assisting information superimposed and presented to the operator 11131 can alleviate burden on the operator 11131 or ensure the operator 11131 to proceed surgery.

The transmission cable 11400 connecting the camera head 11102 and the CCU 11201 is an electrical signal cable corresponding to communication of electrical signals, an optical fiber corresponding to optical communication, or a composite cable thereof.

In the example illustrated in the drawing, the transmission cable 11400 is used for wired communication. However, communication between the camera head 11102 and the CCU 11201 may be wireless.

An example of the endoscopic surgery system to which the technique according to the present disclosure is applicable has been described above. The technique according to the present disclosure is applicable to, for example, the imager 11402 and the like in the camera head 11102. When the technique according to the present disclosure is applied to the camera head 11102, the camera head 11102 and the like can be miniaturized, resulting in the compact endoscopic surgery system 11000. When the technique according to the present disclosure is applied to the camera head 11102 and the like, a clear image with reduced noise can be acquired to provide the operator with a more visible image. Consequently, the operator's fatigue can be alleviated.

Although the endoscopic surgery system has been described here by way of example, the technique according to the present disclosure may be applied to, for example, a microscopic surgery system.

The foregoing embodiments and modifications can be combined as appropriate as far as the process contents are consistent.

The effects described in the present description are illustrative only and not limitative, and any other effects may be contemplated.

Note that the present technology can also have the following configurations.

(1)

A solid-state imaging device comprising:

an imager configured to acquire image data;

a processing unit configured to perform a process based on a neural network calculation model for data based on the image data acquired from the imager; and a control unit configured to switch between a first process mode of performing a first process at a first frame rate and, based on a result of the first process, a second process mode of performing a second process at a second frame rate.

(2)

The solid-state imaging device according to (1), wherein the processing unit performs a computation process of detecting a certain detection target, for data based on the image data.

(3)

The solid-state imaging device according to (2), wherein the computation process is a process using a pre-trained learning model.

(4)

The solid-state imaging device according to any one of (1) to (3), wherein the second process is a process that does not perform a process based on a neural network calculation model for data based on the image data acquired from the imager.

(5)

The solid-state imaging device according to (4), wherein the second process is a process of reading out the image data at the second frame rate that is higher than the first frame rate, without performing a process based on a neural network calculation model for data based on the image data acquired from the imager, when a certain detection target is detected in the first process mode.

(6)

The solid-state imaging device according to any one of (1) to (3), wherein the second process is a process in which a process of reading out image data from the imager is temporally overlapped with a process of performing a process based on a neural network calculation model for data based on the image data acquired from the imager.

(7)

The solid-state imaging device according to (6), wherein the second process is a process of performing a process based on a neural network calculation model for data based on the image data acquired from the imager, at the second frame rate that is the same frame rate as the first frame rate, when a certain detection target is detected in the first process mode.

(8)

The solid-state imaging device according to (7), wherein the second process is a process of performing a process based on a neural network calculation model for data based on the image data acquired from the imager, at the second frame rate that is higher than the first frame rate, when a certain detection target is detected in the first process mode.

(9)

The solid-state imaging device according to any one of (2) to (8), wherein the control unit starts the process based on the neural network calculation model for data based on the image data by the computation process, after readout of the image data from the imager is completed in a state in which the first process mode is selected.

(10)

The solid-state imaging device according to any one of (2) to (9), wherein the control unit starts readout of the image data from the imager, after the computation process is completed in a state in which the first process mode is selected.

(11)

An electronic device comprising:

a solid-state imaging device including an imager configured to acquire image data, a processing unit configured to perform a process based on a neural network calculation model for data based on the image data acquired from the imager, and a control unit configured to switch between a first process mode of performing a first process at a first frame rate and, based on a result of the first process, a second process mode of performing a second process at a second frame rate; and a control device configured to perform a process by an application for the image data output from the solid-state imaging device.

REFERENCE SIGNS LIST

1 imaging device
10 image sensor
11 imager
12 controller
13 signal processor
14 DSP (processing unit)
15 memory
16 selector
20 application processor
30 cloud server

The invention claimed is:

1. A solid-state imaging device, comprising:

an imager configured to acquire image data;

a processing unit configured to execute, in a first process mode, a first process using a neural network calculation model based on the acquired image data, wherein the first process is executed at a first frame rate; and a control unit configured to:

control execution of a second process at a second frame rate, wherein the second process corresponds to a second process mode, and the second process is executed without the neural network calculation model; and switch between the first process mode and the second process mode based on a result of the first process.

2. The solid-state imaging device according to claim 1, wherein the processing unit is further configured to execute a computation process of detection of a certain detection target, the detection of the certain detection target is based on the image data.

3. The solid-state imaging device according to claim 2, wherein the computation process is based on a pre-trained learning model.

4. The solid-state imaging device according to claim 2, wherein the control unit is further configured to:

readout the image data from the imager based on a selection of the first process mode; and start the first process based on the neural network calculation model after the readout of the image data from the imager is completed.

5. The solid-state imaging device according to claim 2, wherein the control unit is further configured to start readout of the image data from the imager after the computation process is completed in a state in which the first process mode is selected.

6. The solid-state imaging device according to claim 1, wherein in a case where a certain detection target is detected in the first process mode, the second process executes read out of the image data at the second frame rate without the execution of the first process that uses the neural network calculation model, and the second frame rate is higher than the first frame rate.

7. An electronic device, comprising:

a solid-state imaging device including:

an imager configured to acquire image data;

a processing unit configured to execute, in a first process mode, a first process using a neural network calculation model based on the acquired image data, wherein the first process is executed at a first frame rate; and a control unit configured to:

control execution of a second process at a second frame rate, wherein the second process corresponds to a second process mode, and the second process is executed without the neural network calculation model; and switch between the first process mode and the second process mode based on a result of the first process; and a control device configured to execute a process by an application for the image data output from the solid-state imaging device.

8. A solid-state imaging device, comprising:

an imager configured to acquire image data;

a processing unit configured to execute, in a first process mode, a first process using a neural network calculation model based on the acquired image data, wherein the first process is executed at a first frame rate; and a control unit configured to:

control execution of a second process at a second frame rate, wherein the second process corresponds to a second process mode, in a case where a certain detection target is detected in the first process mode, the second process executes read out of the image data without execution of the first process that uses the neural network calculation model, and the second frame rate is higher than the first frame rate; and switch between the first process mode and the second process mode based on a result of the first process.

9. A solid-state imaging device, comprising:

an imager configured to acquire image data;

a processing unit configured to execute, in a first process mode, a first process using a neural network calculation model based on the acquired image data, wherein the first process is executed at a first frame rate; and a control unit configured to:

control execution of a second process at a second frame rate, wherein the second process corresponds to a second process mode, and in the second process, a process of read out of the image data from the imager is temporally overlapped with the first process that is executed using the neural network calculation model; and switch between the first process mode and the second process mode based on a result of the first process.

10. The solid-state imaging device according to claim 9, wherein in a case where a certain detection target is detected in the first process mode, the second process is executed at the second frame rate based on the neural network calculation model, and the second frame rate is the same as the first frame rate.

11. The solid-state imaging device according to claim 9, wherein in a case where a certain detection target is detected in the first process mode, the second process is executed at the second frame rate based on the neural network calculation model, and the second frame rate is higher than the first frame rate.

* * * * *